US006991115B2

(12) United States Patent
Chow et al.

(10) Patent No.: US 6,991,115 B2
(45) Date of Patent: Jan. 31, 2006

(54) ADD-ON STORAGE DEVICE FOR CD AND/OR DVD CASES

(75) Inventors: Tat-Chi Chow, Hong Kong (CN); Wai-Ming Lau, Hong Kong (CN)

(73) Assignee: Sunhing Millennium Ltd., Hong Kong (CN)

( * ) Notice: Subject to any disclaimer, the term of this patent is extended or adjusted under 35 U.S.C. 154(b) by 0 days.

(21) Appl. No.: 10/411,223

(22) Filed: Apr. 11, 2003

(65) Prior Publication Data

US 2003/0234229 A1 Dec. 25, 2003

(30) Foreign Application Priority Data

Apr. 17, 2002 (DE) ............................ 202 06 010 U

(51) Int. Cl.
*A47G 19/08* (2006.01)
(52) U.S. Cl. ...................... 211/40; 211/188; 211/189; 312/111
(58) Field of Classification Search ................. 211/40, 211/188, 90.01, 90.02, 194, 189, 175, 126.2, 211/41.12; 312/108, 107, 111
See application file for complete search history.

(56) References Cited

U.S. PATENT DOCUMENTS

| 3,168,365 | A | * | 2/1965 | Evans | 312/351 |
|---|---|---|---|---|---|
| 4,440,299 | A | | 4/1984 | Peinecke et al. | |
| 4,889,244 | A | * | 12/1989 | Hehn et al. | 211/40 |
| 5,427,446 | A | * | 6/1995 | Glomski | 312/242 |
| 5,588,541 | A | * | 12/1996 | Goetz | 211/188 |
| 5,749,477 | A | * | 5/1998 | Chang | 211/40 |
| 6,039,190 | A | * | 3/2000 | Clausen | 211/40 |
| 6,126,022 | A | * | 10/2000 | Merkel | 211/135 |
| 6,203,128 | B1 | | 3/2001 | Koziol | |
| 6,446,817 | B1 | * | 9/2002 | Stitt | 211/41.12 |
| 6,520,356 | B2 | * | 2/2003 | Miller, Jr. | 211/188 |
| 2002/0063100 | A1 | * | 5/2002 | Kwang | 211/40 |
| 2002/0108915 | A1 | * | 8/2002 | Stitt | 211/41.12 |
| 2002/0125200 | A1 | * | 9/2002 | Skinner et al. | 211/40 |
| 2004/0124162 | A1 | * | 7/2004 | Yi | 211/40 |

FOREIGN PATENT DOCUMENTS

| AU | 492 386 B | 6/1976 |
|---|---|---|
| DE | 31 06 511 A1 | 9/1982 |
| DE | 40 09 306 A1 | 10/1991 |
| DE | 40 32 531 C1 | 1/1992 |
| EP | 0 155 601 A2 | 9/1985 |
| EP | 0 451 428 A | 10/1991 |
| EP | 0 552 627 A1 | 7/1993 |
| FR | 2 646 547 A | 11/1990 |
| FR | 2739718 A | 4/1997 |
| GB | 2 342 280 A | 4/2000 |

\* cited by examiner

*Primary Examiner*—Jennifer E. Novosad
(74) *Attorney, Agent, or Firm*—Buchanan Ingersoll PC

(57) ABSTRACT

An add-on storage device for flat objects, particularly CD and/or DVD cases, is made up of box-shaped housing elements which are open at the front and lie against one another with facing side walls. Clip-shaped connection elements are pushed onto adjoining side walls which form a common edge, in a predetermined fastening region from the open housing side and from the opposite bottom side, to engage over the side walls at the inner surface of the housing elements. In the fastening region, the open side at the inner surfaces of the adjoining side walls have a depression and/or elevation, and the connection element has an associated elevation and/or depression. The elevation and/or depression of the inner surface of the side wall forms a positive lock-in connection with the associated depression and/or elevation at the connection element.

6 Claims, 6 Drawing Sheets

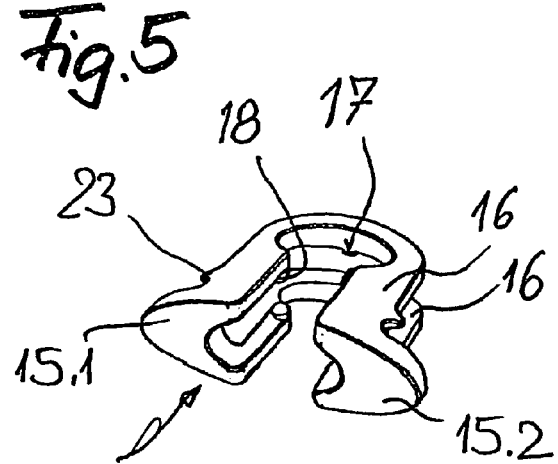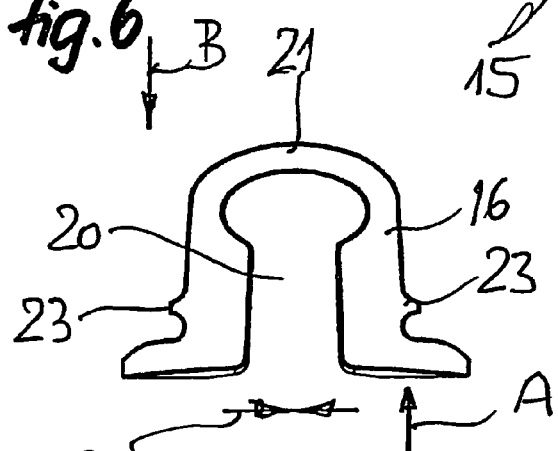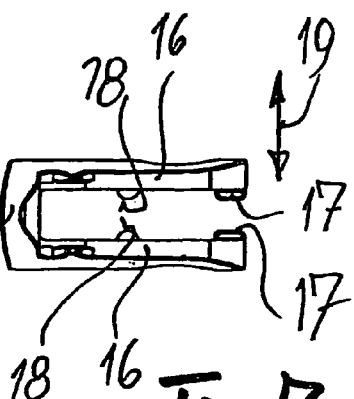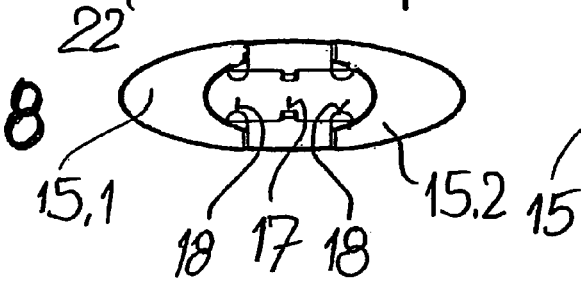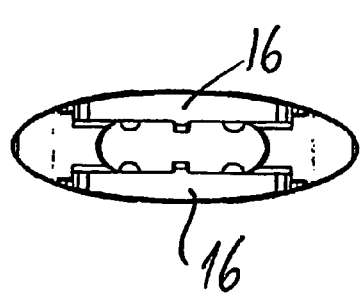

Figure 1:
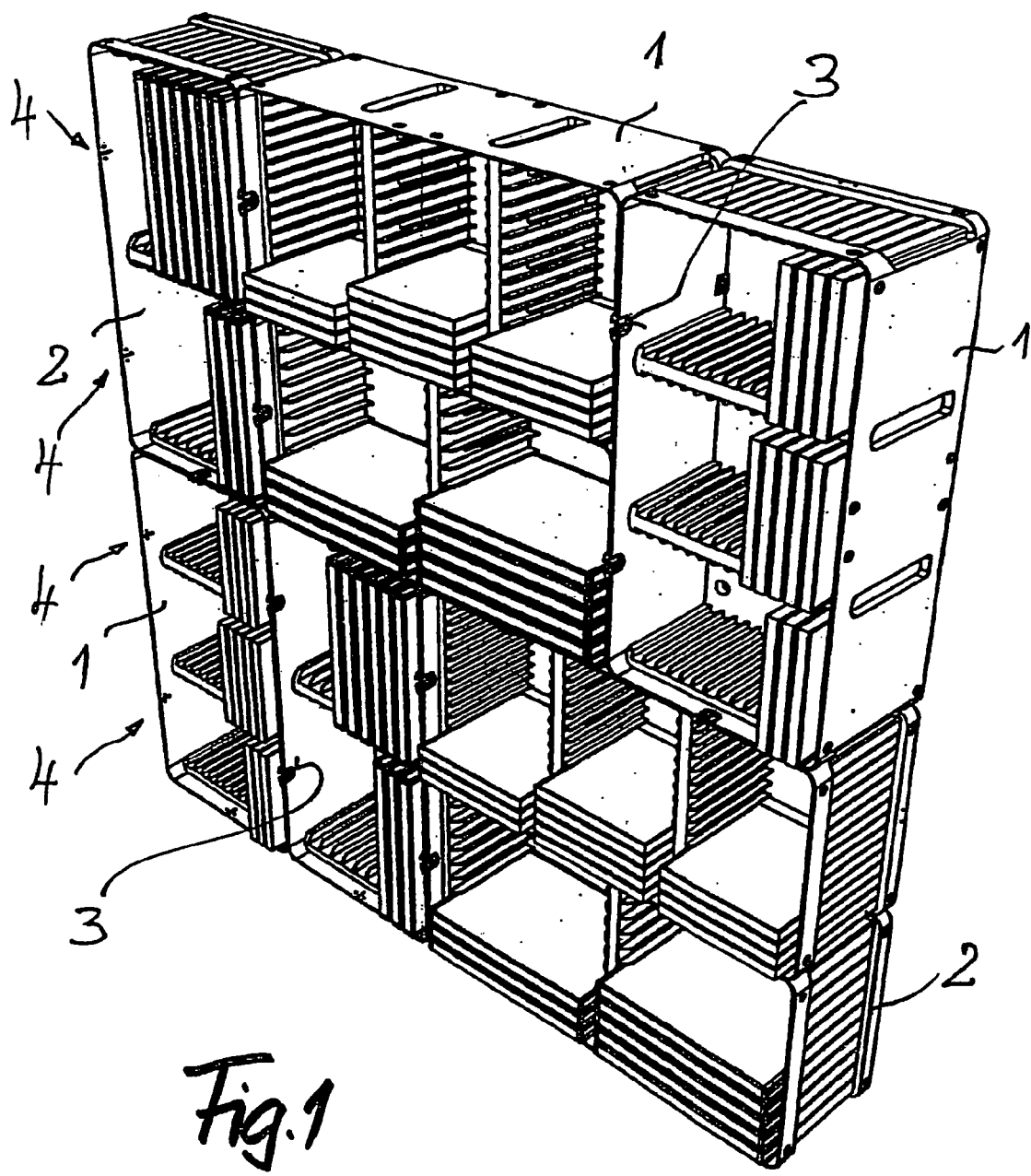

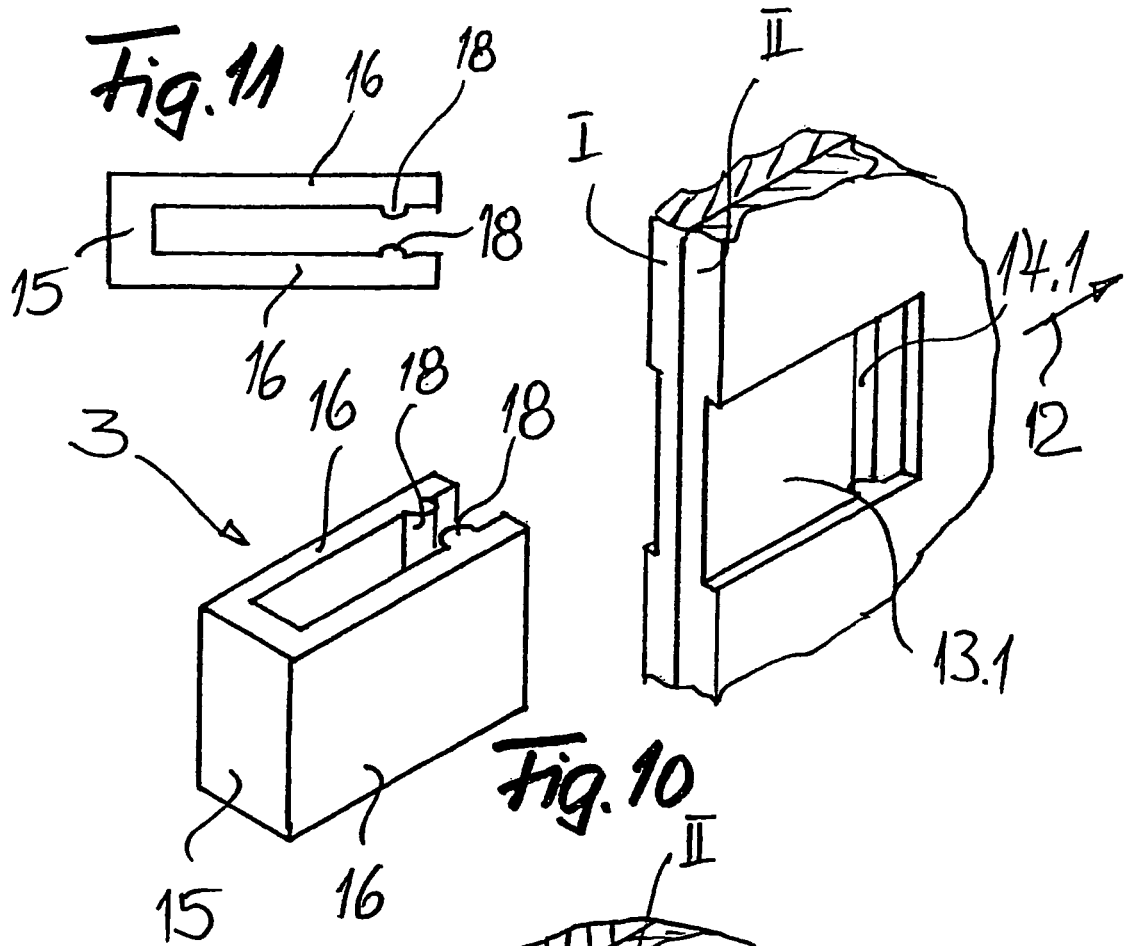
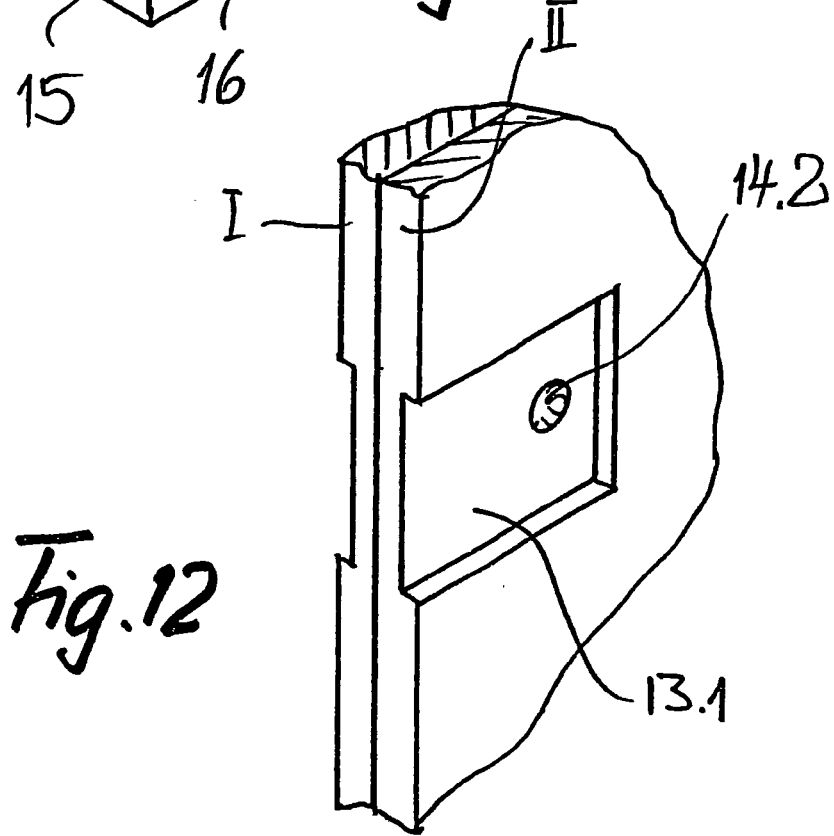

ADD-ON STORAGE DEVICE FOR CD AND/OR DVD CASES

It is known to use-box-shaped housings which are open at the front to store flat objects, in particular CD cases and/or DVD cases, simply called CD cases in the following, which housings are provided at the inner surfaces of at least two opposite side walls with a plurality of parallel guide webs which define push-in compartments for the CD cases.

In order to satisfy the increasing space requirement of a growing CD collection, it is also known to form the housings in terms of shape and dimensions as co-ordinated housing elements, so that housing elements of this kind can be progressively assembled according to the increasing space requirement to form a storage device increasing in size, with adjacent housing elements lying against one another with facing side walls. Fastening clips are provided for the purpose of fixing the housing elements together, these clips each being pushed onto the common edge of two adjoining side walls and engaging over the inner surfaces of the walls. The fastening clips are made of a resilient material, for example an appropriate plastics material, and are placed over the common edge with a frictional grip in the fastening region.

However, where the structure of a relatively large storage device already of cabinet-like dimensions is concerned, this kind of frictional retention of the fastening clips is no longer sufficiently reliable, so that the object of the invention is to provide an add-on storage device of the type indicated above in which the individual housing elements are reliably connected together.

This object is solved according to the invention by an add-on storage device for flat objects, in particular CD cases and/or DVD cases, comprising at least two box-shaped housing elements which are open at the front and lie against one another with facing side walls, at least two clip-shaped connection elements which can be pushed onto the adjoining side walls, which form a common edge, in a predetermined fastening region both from the open housing side and from the opposite bottom side and engage over the side walls at the inner surface of the housing elements, and in the fastening region at least of the open side at the inner surfaces of the adjoining side walls at least one depression and/or elevation, and, associated with the latter, at least one elevation and/or depression at the connection element.

This results in the possibility of a positive lock-in connection between the housing elements on the one hand and the clip-shaped connection elements, which fix the latter together, on the other, so that these are secured against unintentional release. This applies in particular to the connection elements which are mounted at the front side of a storage device of this kind and which are secured against unintentional withdrawal when removing a CD case. However the clip-shaped connection elements, which are pushed onto the bottom side, can only be held with a frictional grip, as the rear wall of the storage device which is formed by the bottom sides of the housing elements generally faces a building wall or the wall of a piece of furniture. The provision of elevations at the connection elements increases the frictional grip.

Figure 2:
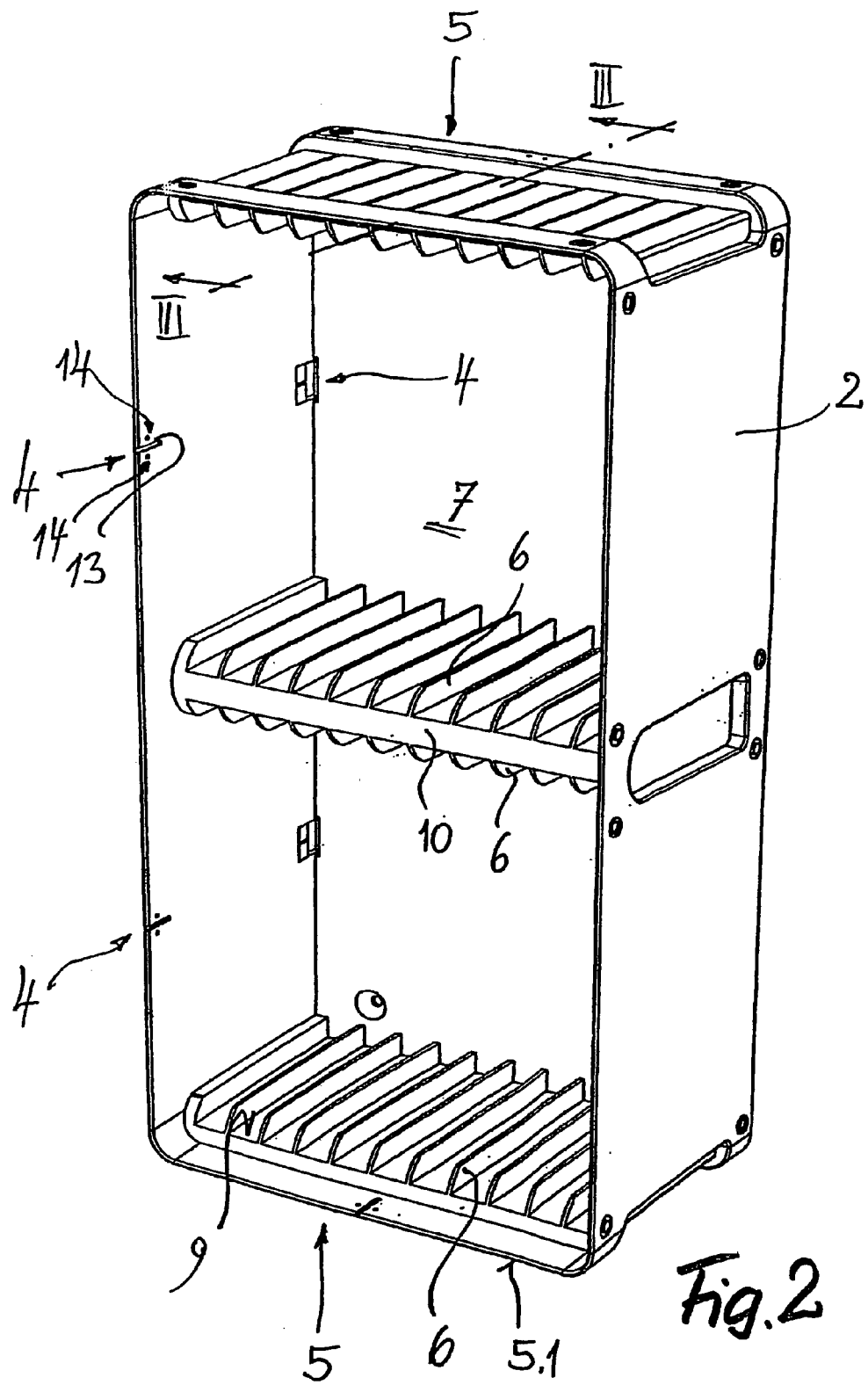
Figure 3:
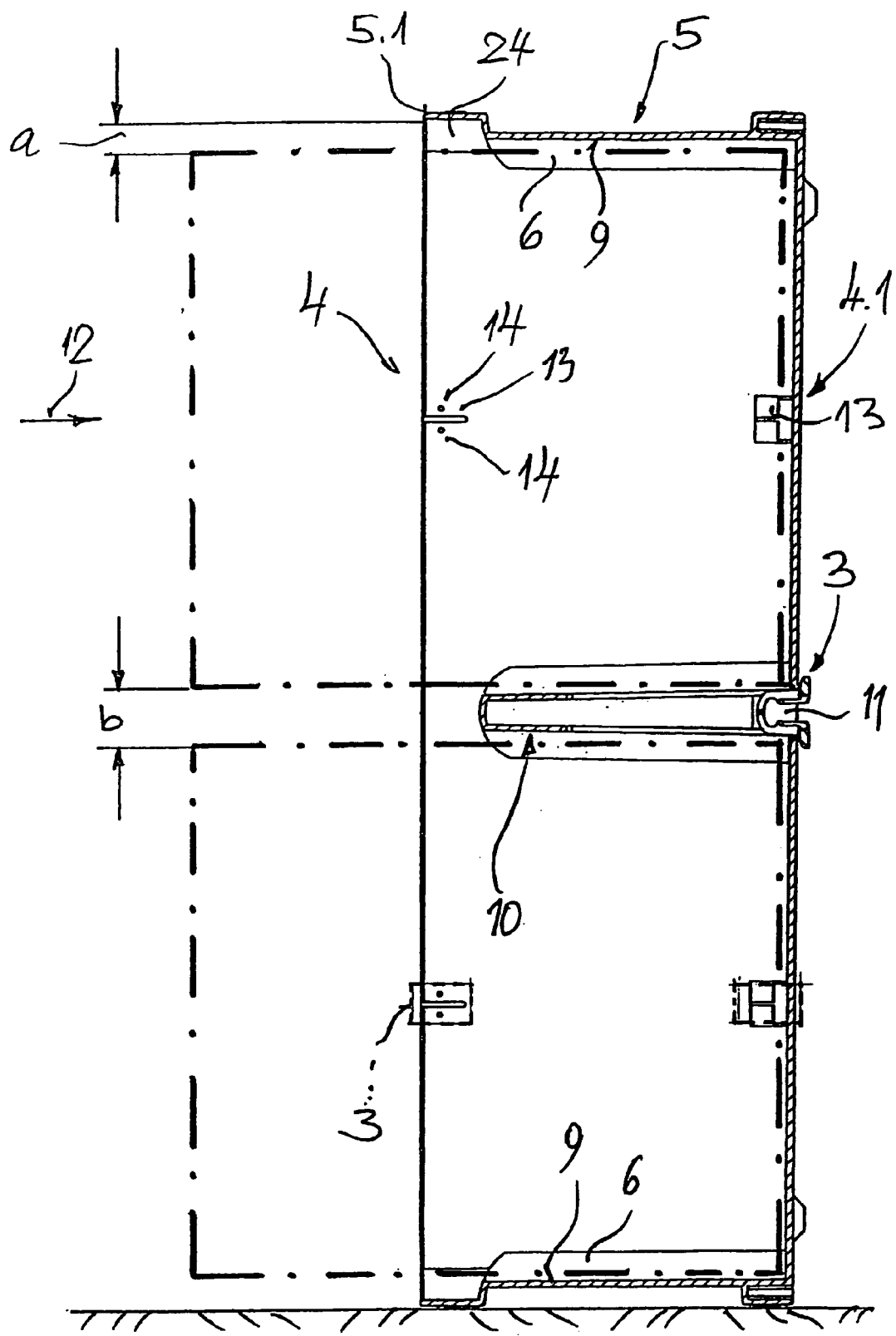
Figure 4:
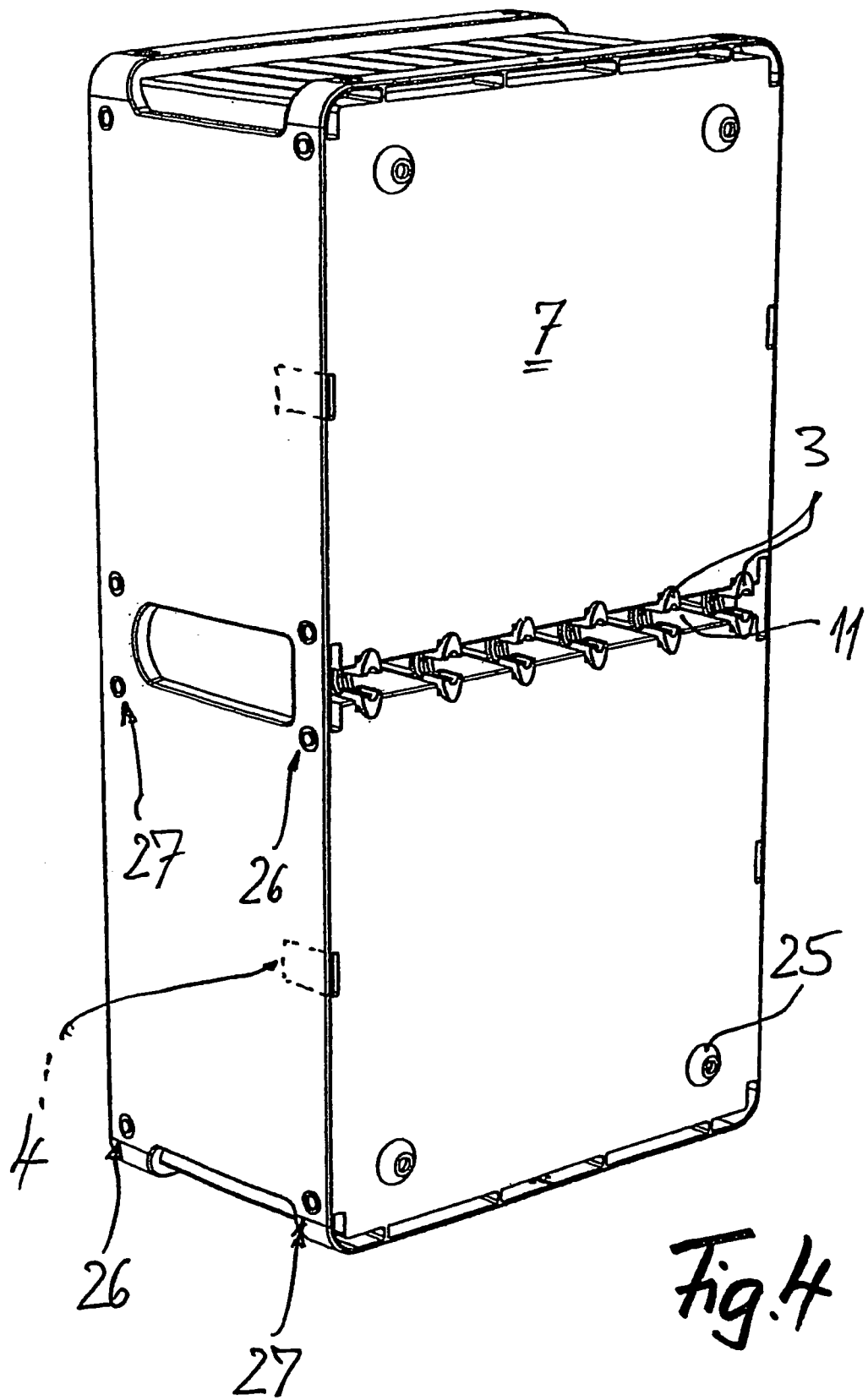

Further features of the invention can be found in the claims and the description of embodiments on the basis of schematic drawings, in which:

FIG. 1 is a front view of an add-on storage device, composed of a plurality of box-shaped housing elements, for CD and/or DVD cases, FIG. 2 is a perspective front view of a housing element, FIG. 3 is a vertical section along the line III in FIG. 2, FIG. 4 is a perspective rear view, FIG. 5 is a perspective view of a first embodiment of a clip-shaped connection element, FIG. 6 is a plan view onto the connection element, FIG. 7 is a side view of the connection element, FIG. 8 is a view onto the front side of the connection element, FIG. 9, is a view onto the plug-in side of the connection element, FIG. 10 is a perspective view of a second embodiment of the clip-shaped connection element with associated connection region of the housing elements, FIG. 11 is a plan view onto the connection element according to FIG. 10, FIG. 12 is a modified embodiment of the connection region.

An add-on storage device, which is composed of a plurality of housing elements 1 and 2, both for CD cases and for DVD cases is represented in FIG. 1. Here the housing elements 1 serve to accommodate CD cases, while the housing elements 2 serve to accommodate DVD cases, which are of larger dimensions. As can be seen from the drawing, the housing elements 1 and the housing elements 2 are adapted to one another in terms of dimensions such that they can be combined with one another practically as desired within a predetermined grid. It is therefore also possible to combine housing elements which only serve to accommodate CD cases, or only to accommodate DVD cases.

In the regions in which the housing elements 1, 2 lie against one another with their side walls these are connected together via clip-shaped connection elements 3 both from the open front side and from the bottom side, so as to produce a stable, cabinet-like storage device as a whole. As all four walls of each housing element are provided with fastening regions 4, it is immediately possible to add further housing elements at the side and/or at the top.

A housing element 2 for storing DVD cases is represented in a perspective view in FIG. 2. The box-shaped housing comprises at two opposite end walls 5 a plurality of webs 6, which extend from the open side as far as the bottom surface 7 and form push-in compartments for the DVD cases which are to be pushed in. These webs may be moulded onto the inner surface of the side wall or, as represented here, moulded onto a stepped part 8, which defines a push-in plane 9 offset with respect to the side wall 5.

A respective partition wall 10 is provided for the housing element 2, while—on account of the smaller dimensions of the CD cases—two partition walls are accordingly provided for the housing elements 1, these walls likewise being provided with corresponding webs 6.

As shown by the vertical section in FIG. 3 and the perspective rear view in FIG. 4, the partition wall 10 is formed as a hollow body which is open to the rear and the cavity of which is accessible through a slot-shaped opening 11 in the bottom 7.

In the embodiment which is represented here the fastening regions 4 comprise a groove-shaped depression 13, which extends in the push-in direction (arrow 12), and two cup-shaped depressions 14. The corresponding fastening region 4.1, which is associated with the back side, is just provided with a groove-shaped depression 13.

The positioning of the fastening clips 3 is indicated schematically in the lower part of FIG. 3.

The fastening clips 3, the form of which is described in greater detail in the following, are formed such that any fastening clips 3 which are not required can be inserted in the slot-shaped opening 11 in the bottom 7 of the housing element, as represented in FIG. 4, and thus safely stored. The fastening clips of add-on systems known until now were inserted in bags or pouches included for sale in the covering cardboard, so that after removing the latter the user had to make provision for separately storing the connection elements not required. The advantage of the solution according to the invention lies in the fact that all connection elements 3 are already inserted as represented in FIG. 4 for sale, so that the user only has to remove the connection elements required at the time. Any connection elements required for a subsequent addition can then be removed as required.

FIG. 5 is a perspective view of an embodiment of a connection element. This consists essentially of a two-part base part 15.1 and 15.2, which is provided with two resilient clamping jaws 16 extending parallel to and at a spacing from one another and provided at their facing sides with elevations 17 and 18.

FIG. 6 is a plan view. Related to FIG. 6, FIG. 8 is a view in the direction of the arrow A and FIG. 9 a view in the direction of the arrow B.

FIGS. 7 and 8 show the form and the position of the elevations 17 and 18 at the clamping jaws 16. The elevations 17 and 18 are in this respect dimensioned such that, as indicated in FIG. 3, when the connection element is pushed on in the direction of the arrow 12 the elevation 17 engages in the groove-shaped depression 13 and, after completely pushing on the connection element 3, the elevations 18 engage in the cup-shaped depressions 14, and the connection element positively interlocks with the two adjoining side walls. As represented in FIG. 7, the clamping jaws 16 can be resiliently spread apart with respect to the base part 15 in the direction of the double arrow 19. The base part 15 may be formed continuously in one piece.

As can be seen in the embodiment according to FIG. 6, a recess 20 directed transversely to the clamping jaws is provided, this recess also dividing the base part 15 into the parts 15.1 and 15.2. The connection element can thus also be pushed together with respect to the bow-like ends 21 of the two clamping jaws 16 in the direction of the double arrow 22. It is therefore possible, as represented in FIGS. 3 and 4, to insert the connection element in the slot-shaped opening 11 in the bottom 7 of the housing element and positively fix it in a resilient manner via lock-in noses 23, which are disposed at the outer edge of the clamping jaws 16.

The association of elevations at the connection element 3 with the depressions 13, 14 at the housing elements 1, 2 may also be reversed.

A simplified embodiment of the connection element 3 as well as a correspondingly formed connection region 4 are represented in FIG. 10.

A respective shallow depression 13.1 is disposed in the inner surfaces of adjoining side walls I and II in the connection region 4, the width dimension of which depression is only slightly wider than that of the associated connection element 3. A groove-shaped depression 14.1 is formed into the depression 13.1, this extending transversely to the push-in direction 12 for the connection element 3.

Corresponding projections 18.1 are provided at the connection element 3, these each locking into the groove-shaped depressions 14.1 when the connection element 3 is pushed on. Guidance in the push-in direction is effected by the mutually associated side edges of the depression 13.1 and the clamping jaws 16 of the connection element 3. This means that the depression 13.1 on the one hand and the connection element 3 on the other co-operate to perform the function of the elevations 17 at the connection element 3 in the embodiment according to FIG. 7 and the groove-shaped depression 13 according to FIG. 3.

FIG. 12 shows a modification of this embodiment, in which the slot-shaped depression 14.1 is replaced by a cup-shaped depression 14.2, in which case corresponding elevations are then associated at the clamping jaws of the mating connection element, these likewise interlocking with the cup-shaped depression 14.2 when pushing on the connection element.

As shown by the vertical section according to FIG. 3, the represented embodiment is formed such that the parallel guide webs 6 disposed at the opposite side walls 5 are disposed in a push-in plane 9 extending inwards so as to be set back at a spacing a with respect to the edge 5.1 forming the opening of the housing elements. This results in a free access space 24 via which it is possible to take hold of the CD case represented by dot-dash lines.

The partition wall 10 formed as a hollow body has a distinct thickness dimension, so that—on account of the spacing b—it is also easy to take hold of superimposed CD cases when the latter, lying close together, completely fill the corresponding storage compartment.

As can be seen in FIGS. 2 and 4, the housing elements 1, 2 are provided with prefabricated holes 25, which enable housing elements of this kind to be screwed to a building wall individually or as an assembled storage-device.

Annular depressions 26 with internal studs 26.1 are provided at the outer surface of all side walls in order to fix the housing elements together more effectively. As shown by FIG. 4, these depressions 26 are disposed diagonally in relation to one another. Annular beads 27, which project beyond the side surface, are provided in the opposite diagonals, which beads correspond in terms of dimensions to the annular depression 26 and embrace the stud with their interior space when two adjacent side walls lie against one another. This ensures that the side walls of adjacent housing elements lie closely against one another and are positively fixed against displacement in the plane of their side wall surfaces.

The elements 26 and 27 are disposed in relation to one another and dimensioned such that the structure represented in FIG. 1 is possible.

What is claimed is:

1. Add-on storage device for flat objects, comprising
   at least two box-shaped housing elements, each including an open housing side, an opposite bottom side having a slot, and four side walls, said at least two housing elements lying against one another at adjoining side walls that form a common edge,
   at least two clip shaped connection elements which can be pushed onto the adjoining side walls in a predetermined fastening region from the open housing side and from the opposite bottom side, and engage over the side walls at the inner surface of the housing elements,
   at least one of a depression and an elevation in the fastening region at least of the open side at the inner surfaces of the adjoining walls, and an associated elevation or depression at the connection element, and
   a partition wall in each housing element which is formed as a hollow body that opens outwardly through said slot and receives additional ones of said connection elements.

2. Device according to claim 1, wherein in the fastening region at least at the open side, the elevation or depression of the inner surface of the side wall forms a positive lock-in connection with the associated depression or elevation at the connection element.

3. Device according to claim 1, further including at least one of a groove-shaped depression, which is oriented in a direction of pushing of the connection element and a web-shaped elevation disposed in the fastening region, and wherein the connection element comprises a corresponding elevation or depression.

4. Device according to claim 1, wherein the clip-shaped connection element comprises a base part, which is provided with two resilient clamping jaws extending parallel to and at a spacing from one another and being provided at their facing sides with at least one elevation or depression.

5. Device according to claim 4, wherein the connection element is formed in the shape of a bow by a recess which is directed transversely to the clamping jaws and divides the base part, and further including lock-in-noses disposed at the outer edge of the clamping jaws in a transition region to the base part.

6. Device according to claim 1, wherein a plurality of parallel guide webs, which define push-in compartments, are disposed in a push-in-plane at each of two opposite side walls of each housing element, and the push-in-planes extend at a spacing from the edge defining the open side of the housing element at these side walls.

* * * * *